United States Patent [19]

Kawasaki

[11] Patent Number: 4,694,689
[45] Date of Patent: Sep. 22, 1987

[54] METHOD AND DEVICE FOR SPIN-TESTING OF TURBOCHARGER ROTOR

[75] Inventor: Keiji Kawasaki, Nagoya, Japan

[73] Assignee: NGK Insulators, Ltd., Japan

[21] Appl. No.: 840,754

[22] Filed: Mar. 18, 1986

[30] Foreign Application Priority Data

Mar. 23, 1985 [JP] Japan .................................. 60-59072

[51] Int. Cl.⁴ ........................................... G01M 15/00
[52] U.S. Cl. ...................................... 73/118.1; 73/460
[58] Field of Search .................. 73/119 R, 865.6, 455, 73/456, 457, 460, 118.1, 487

[56] References Cited

U.S. PATENT DOCUMENTS 4,253,031  2/1981  Frister .............................. 417/407 X Primary Examiner—Jerry W. Myracle
Attorney, Agent, or Firm—Parkhurst & Oliff

[57] ABSTRACT

Method of effecting a spin-testing of a turbocharger rotor with its shaft portion fixed to a simulation attachment assembly consisting of components parts which include a thrust bearing, a spacer, a sleeve or compressor rotor, and a lock nut, wherein an integral composite member is formed from at least two parts of the component parts. The testing device includes the attachment assembly with the integral composite member, and a bearing housing for supporting the turbocharger rotor and the attachment assembly rotatably as a unit.

8 Claims, 8 Drawing Figures

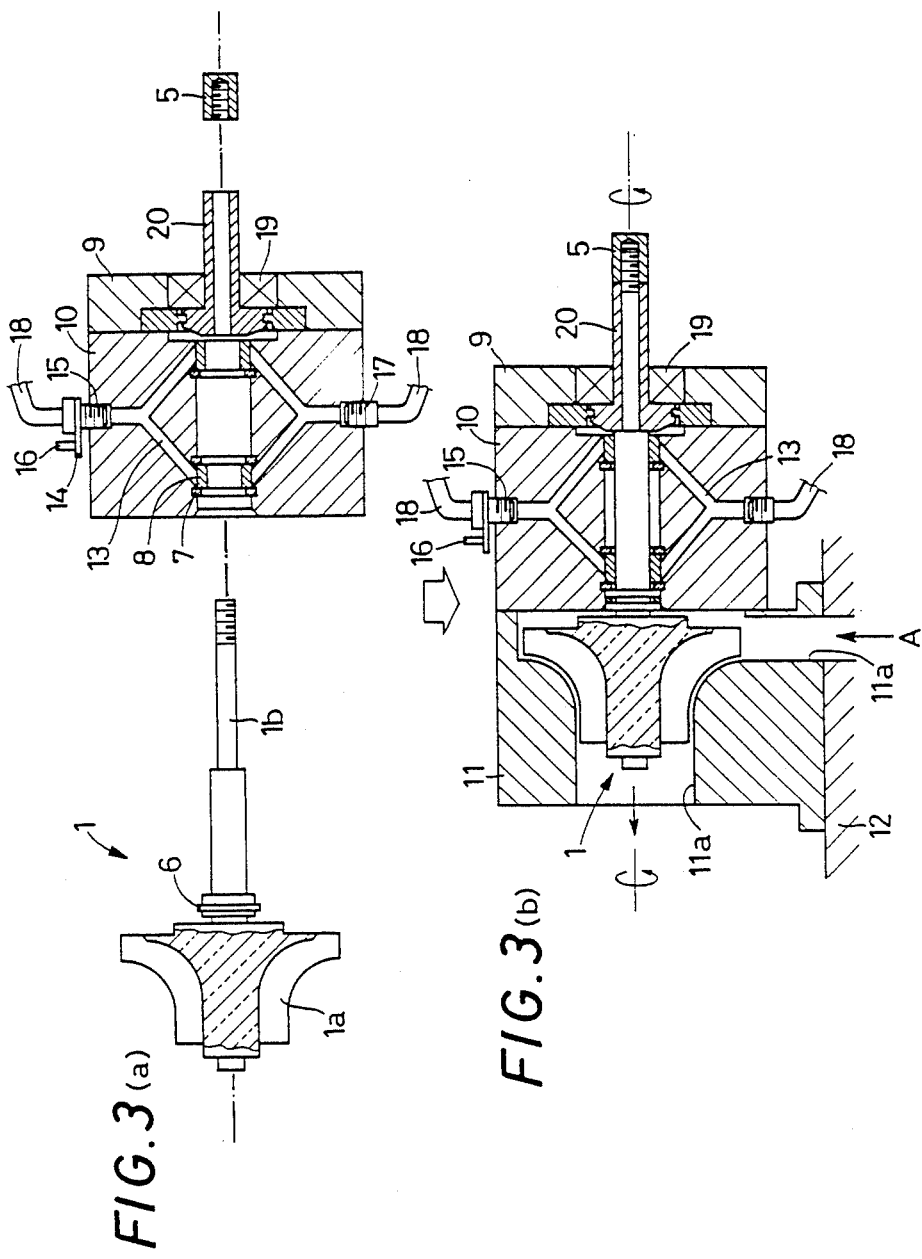

METHOD AND DEVICE FOR SPIN-TESTING OF TURBOCHARGER ROTOR

BACKGROUND OF THE INVENTION

1. Field of the Art

The present invention relates to a method and a device for effecting a spin-testing for a rotor of a turbocharger, and more particularly to such method and device suitable for spinning of the turbocharger rotor with hot gases.

2. Related Art Statement

In the art of motor vehicles, increasing attention is directed at turbocharges which blow an air-and-fuel mixture into the combustion chamber of an engine. Such a turbocharger employs a rotor which is made, for example, from a ceramic material. Since the rotor in use is rotated by exhaust-gas energy of the engine, at a very high speed, e.g., on the order of 100,000 rpm, spin-testing is required to be performed at high speeds at which the rotor is acutally operated. Namely, the rotor is tested in simulated operating conditions, to check the rotor for its operating reliability.

It is desired that a spinning test of the turbocharger rotor be achieved in a simulation testing device in which the turbocharger rotor is rotatably supported in the same conditions as in a turbocharger that is actually incorporated in the motor vehicle. The rotor is spun with a high-velocity stream of gas which is applied to the blade portion of the rotor, while the shaft portion is fixed to a simulation attachment assembly to permit the rotor and the attachment assembly to be rotated as a unit. The simulation attachment assembly corresponds to parts which are acutally connected to the turbocharger rotor. For instance, the spin-testing is performed in the manner which will be described, referring to FIGS. 1(a) and 1(b), and FIGS. 2(a) and 2(b) wherein the turbocharger rotor is indicated generally by 1.

Initially, the turbocharger rotor 1 consisting of a blade portion 1a and a shaft portion 1b is dynamically balanced without the simulation attachment assembly attached. Subsequently, a thrust bearing 2, a spacer 3, a compressor rotor or sleeve 4, and a lock nut 5, which constitute the simulation attachment assembly, are mounted on the shaft portion 1b of the rotor 1, in the order of description. Then, the integral turbocharger rotor and attachment assembly are dynamically balanced as a unit.

Subsequently, the attachment assembly is separated from the turbocharger rotor 1, and the rotor 1 is set in place in a testing device which includes a bearing support 9, a bearing housing 10, a turbine housing 11, and the attachment assembly 2-5. The rotor 1 is installed such that its shaft portion 1b extends through the bearing housing 10 while its blade portion 1a is located within a gas passage 11a formed in the turbine housing 11. The thrust bearing 2, bearing support 9, spacer 3, and compressor rotor or sleeve 4 are fitted on the shaft portion 1b, and are fixed thereto with the lock nut 5. In this connection, it is noted that the component parts 2-5 of the simulation attachment assembly should be attached to the shaft portion 1b of the rotor 1, with the same angular phases relative to the shaft portion 1b, as established when the unit of the rotor 1 and the assembly 2-5 was dynamically balanced.

The bearing housing 10 has an oil passage 13 which is connected at its inlet 15 to a lubricant hose 18 via a flange 14 attached adjacent to the inlet 15. A lubricant from the lubricant hose 18 is introduced through the inlet 15 so as to flow through the passage 13 and to be discharged through an outlet 17. The testing device is provided with a vibration meter 16 (vibrometer) of an acceleration type, which is mounted on the flange 14. The vibration meter 16 senses vibrations of the testing device during a spin-testing of the turbocharger rotor 1 with the attachment assembly 2-5. In FIGS. 2(a) and 2(b), reference numerals 6, 7, 8 and 19 indicate a sealing ring, a snap ring, a radial bearing, and a mechanical seal, respectively.

Problem Solved by the Invention

As described above, the spin-testing method to be practiced on the testing device indicated above requires a procedure of dynamically balancing the rotor 1 and the simulation attachment assembly 2-5 fixed to the shaft portion 1b, before the rotor 1 is set in place on the testing device. Further, after the dynamic balancing of the integral rotor 1 and the attachment assembly 2-5, the component parts of the attachment assembly, that is, the thrust bearing 2, spacer 3, compressor rotor or sleeve 4 and lock nut 5 should be attached to the shaft portion 1b of the rotor 1 so that the individual component parts 2-5 have the same angular phases or positions with respect to the turbocharger rotor 1. Therefore, the testing method requires a cumbersome time-consuming procedure for accurate alignment of the components parts 2-5 with the rotor 1. Furthermore, the bearing support 9 must be removed when the rotor 1 is installed on and removed from the testing device. Consequently, the fluid-tight sealing between the bearing housing 10 and the bearing support 9 must be re-established. Thus, the installation and removal of the turbocharger rotor 1 requires a lot of time as much as one hour for example, and a relatively high level of skill. While the above-indicated known method is satisfactory where the number of the rotors 1 is comparatively small, such method is not considered sufficiently effective when it is required to accomplish the spin-testing of a large number of rotors within a relatively short period of time.

SUMMARY OF THE INVENTION

It is accordingly an object of the present invention to provide an improved method by which spin-testing of a turbocharger rotor is efficiently achieved with a simple procedure.

Another object of the invention is to provide a device suitable for practicing the above method.

According to the present invention, there is provided a method of effecting a spin-testing of a turbocharger rotor with its shaft portion fixed to an assembly consisting of component parts which include a thrust bearing, a spacer, a sleeve or compressor rotor, and a lock nut, wherein the improvement comprises the steps of: preparing an integral composite member consisting of at least two functional portions which function as at least two parts of the component parts of the assembly, respectively; dynamically balancing the turbocharger rotor, without the shaft portion fixed to the assembly; setting the turbocharger rotor and the integral composite member in place in a testing device, such that the shaft portion and the assembly are fixed to each other by the lock nut and rotatable as a unit; and rotating the turbocharger rotor and the assembly in the testing device, to effect the spin-testing.

According to another aspect of the invention, there is provided a device for effecting a spin-testing of a turbocharger rotor having a blade portion and a shaft portion, the device including an assembly consisting of components parts which include a thrust bearing, a spacer, a sleeve or compressor rotor, and a lock nut, and further including a bearing housing for supporting the turbocharger rotor and the assembly such that the shaft portion and the assembly are fixed to each other by the lock nut, and such that the turbocharger rotor and the assembly are rotatable with a high-velocity stream of gases blown to the blade portion of the turbocharger rotor, wherein the improvement comprises: use of an integral composite member consisting of at least two functional portions which function as at least two parts of the component parts, respectively.

BRIEF DESCRIPTION OF THE DRAWINGS

The above and optional objects, features and advantages of the invention will become more apparent by reading the following detailed description of the invention, and the description of the preferred embodiments of the invention, when considered in connection with the accompanying drawings, in which:

FIG. 3(a) is an elevational view in cross section, showing one embodiment of a method of the present invention before the rotor is set in place on a bearing housing of a testing device embodying the invention;

FIG. 3(b) is a view in cross section showing the rotor set in place on the testing device.

DETAILED DESCRIPTION OF THE INVENTION

The testing method and device of the present invention use a simulation attachment assembly which includes an integral composite member which consists of at least two functional portions. These functional portions of the integral composite member are functionally equivalent to at least two adjacent component parts of a conventional simulation attachment assembly which consists of a thrust bearing, a spacer, a sleeve or compressor rotor and a lock nut. Examples of the integral composite member of the attachment assembly are indicated at 20 in FIGS. 3(a) and 3(b), and at 22 in FIGS. 4(a) and 4(b). The integral composite member 20 of FIGS. 3(a) and 3(b) consists of three functionally different portions which function as the thrust bearing, spacer and sleeve of the conventionally used attachment assembly. The composite member 22 of FIGS. 4(a) and 4(b) consists of two functionally different portions which function as the spacer and sleeve of the conventional attachment assembly.

Figure 4A:
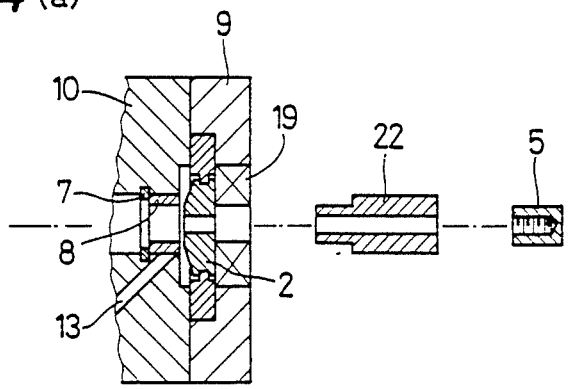
FIGS. 4(a) and 4(b) are views corresponding to FIGS. 3(a) and 3(b), illustrating modified embodiments of the testing method and device of the invention.
Figure 4B:
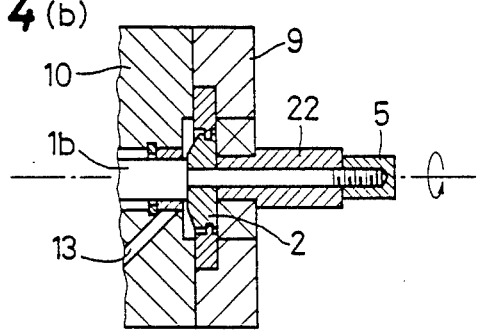

Prior to effecting a spin-testing of the turbocharger rotor 1 on the testing device which uses the integral composite member, the turbocharger rotor 1 is dynamically balanced by using a suitable dynamic balancing device. Meanwhile, the composite member 20 which includes the thrust bearing portion [FIGS. 3(a) and 3(b)], is fitted in a bearing support 9. The composite member 20 and the bearing support 9 are properly aligned with a bearing housing 10. In the case of FIGS. 4(a) and 4(b), the thrust bearing 2 and the composite member 22 are fitted in the bearing support 9. Subsequently, the dynamically balanced turbocharger rotor 1 is set such that the shaft portion 1b extends through the bearing housing 10, and the composite member 20 (or thrust bearing 2 and composite member 22). Then, the composite member 20, or thurst bearing 2 and composite member 22 is (are) fixed to the shaft portion 1b of the rotor 1 with the lock nut 5, together with suitable sleeves, if necessary. At this time, it is not necessary to establish specific angular relative positions between the rotor 1 and the attachment assembly 20, 5 (2, 22, 5). A composite assembly of the rotor 1, bearing housing 10, bearing support 9 and attachment assembly 20, 5 (2, 22, 5) is positioned relative to a turbine housing 11 and secured to a base structure 12 of the testing device, so that the blade portion 1a of the rotor 1 is located within a gas passage 11a formed in the turbine housing 11. In this condition, the blade portion 1a is exposed to a flow of a high-velocity stream of gases introduced into the gas passage 11a. Finally, the turbocharger rotor 1 and the simulation attachment 20, 5 (2, 22, 5) are rotated as a unit with the high-velocity stream of gases through the gas passage 11a. In the arrangement indicated above, it is not required to remove the bearing support 9 from the bearing housing 10 when the rotor 1 is changed from one to another. Accordingly, the lubricant hoses 18 need not be disconnected from the inlet 15 and outlet 17 of the oil passage 13 formed through the housing 10, in order to avoid leakage of the lubricant upon removal of the bearing support 9.

As described above, the method and device of the invention for effecting a spin-testing of the turbocharger rotor are adapted to employ an integral composite member which has a plurality of functionally different portions that are equivalent to a plurality of separate rotary component parts of the conventionally used attachment assembly. The use of this integral composite member eliminates cumbersome accurate angular alignment of the component parts of the simulation attachment assembly with respect to the dynamically balanced rotor. In other words, the turbocharger rotor and the attachment assembly may be readily set on the testing device by simply inserting the shaft portion of the rotor through the bearing housing and by tightening the lock nut. Further, the use of the composite member contributes to reducing a variation or fluctuation in dynamic balancing from one component to another of the attachment assembly, thereby making it possible to hold the overall variation in dynamic balancing of the attachment assembly within a permissible range. Thus, the instant method and device eliminate the otherwise required step of dynamically balancing the rotor and the attachment assembly before they are set on the testing device.

The elimination of the dynamically balancing step of the rotor and the simulation attachment assembly fixed to each other, leads to elimination of the conventionally required procedure of removing the bearing support 9 from the bearing housing 10, when the attachment assembly is removed for dynamic balancing together with each turbocharger rotor to be tested. Therefore, the bearing support 9 may be held attached to the bearing housing 10 when the rotor to be tested is changed. Consequently, it is unnecessary to drain the lubricant oil from the oil passage 13, and re-establish the fluid-tight sealing between the bearing housing 10 and the bearing support 9.

Hence, the instant arrangement of the invention provides for significant reduction in time and effort necessary for placing the turbocharger rotor in the testing device. The instant arrangement permits the turbocharger rotor to be set on or removed from the testing device within about one minute, and also facilitates other steps of the testing procedure. Thus, the present invention provides a method and device that permit a spin-testing of the turbocharger rotor in a commercially justified fashion.

DETAILED DESCRIPTION OF THE PREFERRED EMBODIMENTS

To further clarify the concept of the present invention, the preferred embodiments of the invention will be described in greater detail. It is to be understood, however, that the invention is by no means confined to the precise disclosure contained herein, but may be embodied with various changes, modifications and improvements which may occur to those skilled in the art, without departing from the spirit and scope of the invention. For an easy understanding of differences between Examples of the invention and comparative Examples, the particulars of the examples and the results of spin-testing are summarized in Table 1 provided at the end of the description.

EXAMPLE 1

Initially, the ceramic rotor 1 of a turbocharger was mounted on a dynamic balancing machine of a soft type. An amount and a direction of unbalance of the rotor 1 were indicated on the balancing machine. By cutting off suitable amounts of stock from the blade portion 1a from the appropriate positions on its front and rear sides, the rotor 1 was dynamically balanced with the amount of unbalance reduced to 0.001 g cm or less.

Additionally, the integral composite member 20 consisting of the thrust bearing portion, spacer portion and sleeve portion was set in the bearing support 9, and the support 9 with the composite member 20 was attached to the bearing housing 10, as indicated in FIGS. 3(a) and 3(b). Then, the dynamically balanced turbocharger rotor 1 was placed in the bearing housing 10 such that the shaft portion 1b extends through a bore in the housing 10 and through the composite member 20 supported in the bearing support 9, as indicated in FIG. 3(b). The composite member 20 was fixed to the shaft portion 1b by screwing the lock nut 5 on the externally threaded end of the shaft portion 1b. At this time, no adjustment of the angular position of the composite member 20 relative to the rotor 1 was made. Before the turbocharger rotor 1 was installed on the bearing housing 10, the sealing ring 6 was fitted on the shaft portion 1b, and the lubricant hoses 18 were connected to the inlet and outlet 15, 17 of the oil passage 13. Further, the flange 14 was attached to the housing 10, and the vibration meter 16 was fixed to the flange 14 with screws.

The composite assembly of the bearing housing 10 and the bearing support 9 with the rotor 1 and the composite member 20 supported rotatably as a unit, was positioned relative to the turbine housing 11 secured to the base structure 12 of the testing device, such that the blade portion 1a of the rotor 1 was accommodated within the gas passage 11a formed in the turbine housing 11. The thus positioned composite assembly 9, 10 was bolted to the turbine housing 11.

With the rotor 1 and the simulation attachment assembly 20, 5 rotatably supported on the testing device, a stream of hot gases of 900° C. was introduced into the gas passage 11a, in the direction indicated by arrow A in FIG. 3(b), whereby the rotor 1 was rotated at 180,000 rpm for ten (10) minutes. To check the rotor 1 and the attachment assembly 20, 5 for their spinning condition, the vibration of the testing device was measured by the vibration meter 16 attached to the flange 14 adjacent to the lubricant inlet 15 of the bearing housing 10.

The measurement of the vibration of the testing device during the spinning operation was approximately 10 G. After the spinning operation, the turbocharger rotor 1 was removed from the testing device and examined for any structural abnormalities. The examination reveled no defects. The time spent in installing or removing the turbocharger rotor 1 on or from the testing device was about one minute.

EXAMPLE 2

The cermaic rotor 1 of a turbocharger was dynamically balanced in the same manner as in Example 1. Additionally, the thrust bearing 2 was set in the bearing support 9, and the support 9 with the thrust bearing 2 was attached to the bearing housing 10, as indicated in FIG. 4(a). Then, the dynamically balanced turbocharger rotor 1 was placed in the bearing housing 10 such that the shaft portion 1b extends through the housing 10 and the thrust bearing 2 in the bearing support 9. The composite member 22 which replaces the spacer and sleeve portions, was fitted on the end portion of the shaft portion 1b and fixed thereto with the lock nut 5. No angular alignment of the bearing 2 and the composite member 22 relative to the rotor 1 was attained. Before the turbocharger rotor 1 was installed on the bearing housing 10, the sealing ring 6 was fitted on the shaft portion 1b, and the lubricant hoses 18 were connected to the inlet 15 and outlet 17 of the oil passage 13. Further, the flange 14 was attached to the housing 10, and the vibration meter 16 was fixed to the flange 14 with screws. The composite assembly of the bearing housing 10 and the bearing support 9 with the rotor 1 and the composite member 22 was positioned relative to the turbine housing 11 secured to the base structure of the testing device, and was bolted to the turbine housing 11.

The rotor 1 and the simulation attachment assembly 2, 22, 5 were rotated at 180,000 rpm for 10 minutes with a stream of hot gases of 900° C. blown to the blade portion 1a of the rotor 1, in the same manner as in Example 1. The vibration of the testing device was measured by the vibration meter 16, to check the rotor 1 for its spinning condition.

The measurement of the vibration of the testing device during the spinning operation was approximately 10 G. The tested rotor 1 removed from the testing device was found to have no structural abnormalities. The time spent in installing or removing the turbocharger rotor 1 on or from the testing device was about one minute.

COMPARATIVE EXAMPLE 1

Figures 2A, 2B:
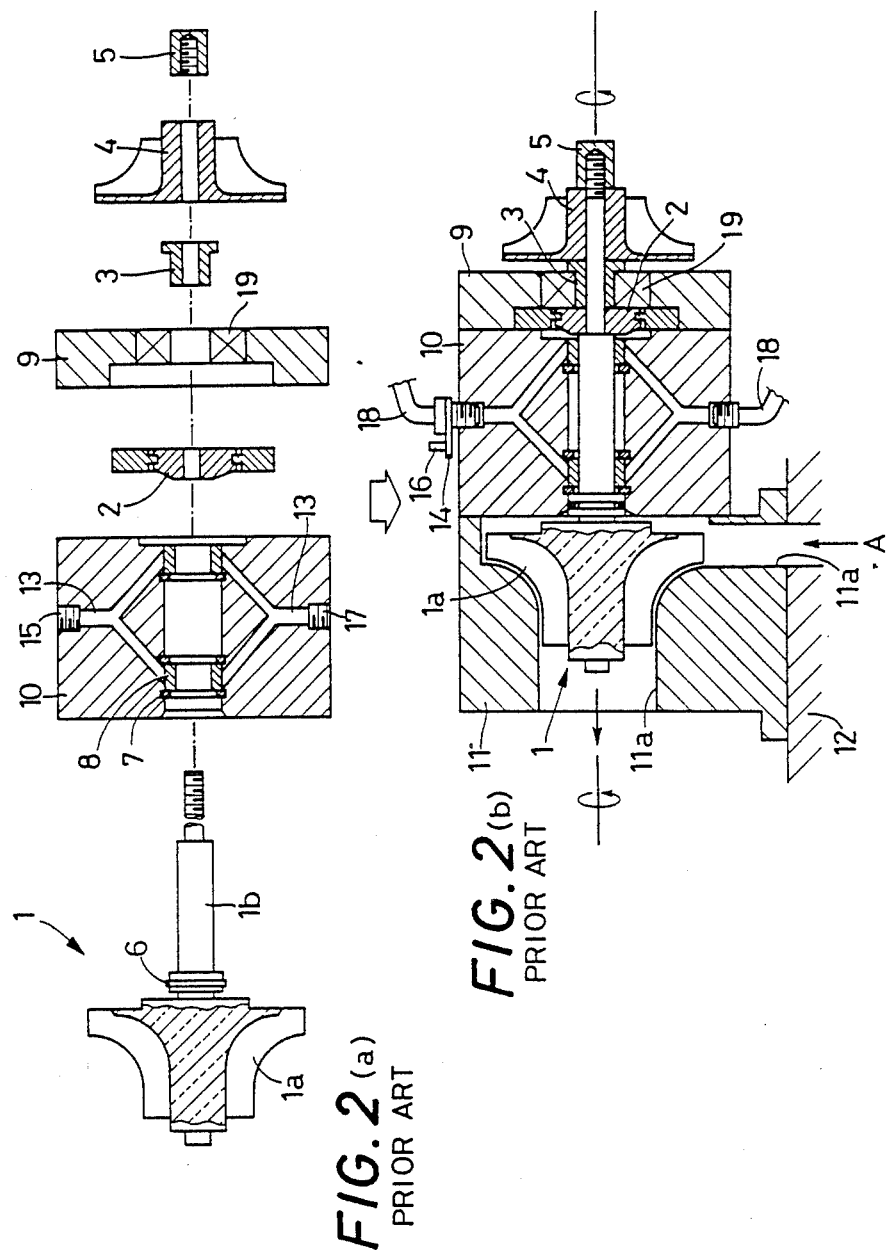
FIG. 2(a) is an exploded elevational view in cross section of the turbocharger rotor and the rotary members before they are set on a bearing housing of a testing device according to a known method.
FIG. 2(b) is an elevational view in cross section, illustrating the rotor and the rotary members after they are set in place on the testing device.

The turbocharger rotor 1 was dynamically balanced in the same manner as in Example 1. Additionally, the sealing ring 6 was fitted on the rotor 1, and the rotor was placed in the bearing housing 10 such that the shaft portion 1b extends through the housing 10. Then, the thrust bearing 2 was mounted on the shaft portion 1b, without an angular positioning of the thrust beariang 2 with respect to the rotor 1. The bearing support 9 was fixed, with screws, to the bearing housing 10 so as to support the thrust bearing 2 as indicated in FIGS. 2(a) and 2(b). In fixing the support 9 to the housing 10, care was taken to avoid leakage of the lubricant and seizure of the thrust bearing 2 during the spin-testing of the rotor 1. Subsequently, the spacer 3 and the compressor rotor 4 were mounted on the shaft portion 1b, and the entire attachment assembly 2-5 was secured to the shaft portion 1b with the lock nut 5. The lubricant hoses 18 were connected to the bearing housing 10, and the flange 14 was fixed adjacent to the inlet 15 of the oil passage 13.

The composite assembly of the bearing housing 10 and the bearing support 9 with the rotor 1 and the attachment assembly 2-5 was positioned relative to the turbine housing 11 secured to the base structure 12 of the testing device, and was bolted to the turbine housing 11.

The rotor 1 and the attachment assembly 2-5 were spun, by introducing a stream of hot gases of 900° C. into the gas passage 13a in the turbine housing 11, in the direction indicated by arrow A in FIG. 2(b), in the same way as in Example 1. The vibration of the testing device exceeded 30 G at the rotating speed of 130,000 rpm. The spin-testing was ceased at this point, to avoid hazardous conditions of the rotor 1.

COMPARATIVE EXAMPLE 2

Figures 1A, 1B:
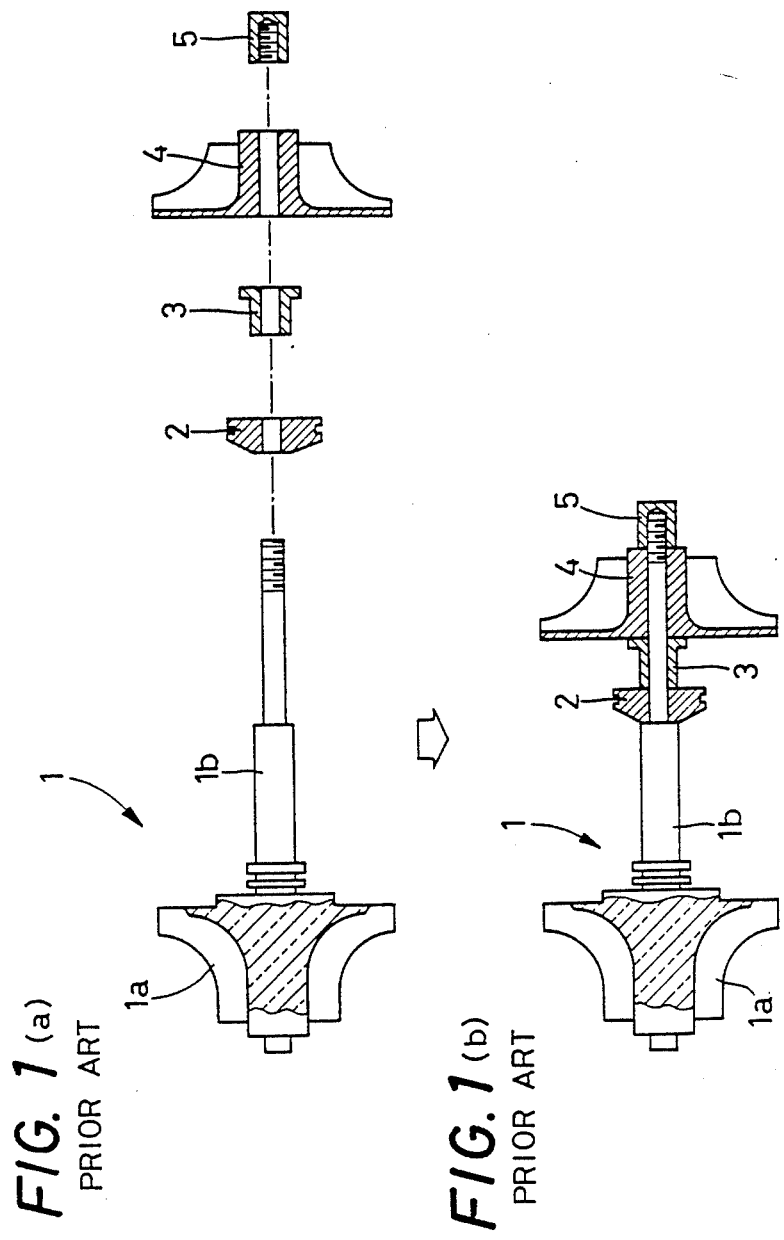
FIG. 1(a) is an exploded schematic elevational view, showing a turbocharger rotor before rotary members are fixed to the rotor.
FIG. 1(b) is a schematic elevational view of the turbocharger rotor and the rotary members assembled as an integrally rotating unit.

The turbocharger rotor 1 was dynamically balanced in the same manner as in Example 1. Additionally, the thrust bearing 2, spacer 3 and compressor rotor 4 were mounted on the shaft portion 1b, and fixed thereto with the lock nut 5, as indicated in FIGS. 1(a) and 1(b). The rotor 1 and the attachment assembly 2-5 fixed thereto were then dynamically balanced. The attachment assembly 2-5 was removed from the rotor 1, after the angular position of each component of the assembly 2-5 relative to the rotor 1 was marked.

Subsequently, the rotor 1 was installed on the bearing housing 10, in the same manner as in Comparative Example 1. The thrust bearing 2, bearing support 9, spacer 3, compressor rotor 4 and lock nut 5 were fixed to the shaft portion 1b of the rotor 1. The bearing 2, spacer 3, rotor 4 and lock nut 5 were carefully aligned with the rotor 1 in order to obtain the same angular positions of the individual components 2-5 relative to the rotor 1, as established when the rotor 1 and the attachment assembly 2-5 were dynamically balanced. The lubricant hoses 18 and the flange 14 were connected or fixed to the bearing housing 10, and the vibration meter 16 was screwed to the flange 14. Successively, the composite assembly of the bearing housing 10 and the bearing support 9 with the rotor 1 and the attachment assembly 2-5 was positioned and fixed to the turbine housing 11.

The rotor 1 and the simulation attachment assembly 2-5 were spun at 180,000 rpm for 10 minutes, with a stream of hot gases of 900° C. introduced in the direction A, in the same way as in Comparative Example 1. The vibration of the testing device was measured by the vibration meter 16, to check the rotor 1 for its spinning condition.

The maximum vibration of the testing device was about 10 G. The examination of the rotor 1 after the spinning revealed no structural defects. However, the testing method and device used in this comparative example require each rotor 1 to be dynamically balanced together with the attachment assembly 2-5, and therefore require time-consuming and cumbersome removal and setting of the assembly 2-5 each time the rotor 1 is changed. Consequently, it took as much as about one hour to complete the setting and removal of the rotor 1 and the assembly 2-5 on or from the bearing housing 10.

TABLE 1

|  | PRESENT INVENTION | | COMPARATIVE | COMPARATIVE |
|---|---|---|---|---|
|  | EXAMPLE 1 | EXAMPLE 2 | EXAMPLE 1 | EXAMPLE 2 |
| Balancing of Rotor | YES | YES | YES | YES |
| Overall Balancing | NO | NO | NO | YES |
| Parts of Attachment Assembly | Member 20 Nut 5 | Member 22 Bearing 2 Nut 5 | C. Rotor 4 Bearing 2 Spacer 3 Nut 5 | C. Rotor 4 Bearing 2 Spacer 3 Nut 5 |
| Test Condition | 900° C. 180,000 rpm | | 900° C. 180,000 rpm | |
| Spinning Vibration | 10 G | | 30 G or higher | 10 G |
| Test Result | GOOD | | Spinning stopped at 130,000 rpm | GOOD |
| Time for Setting/ Removal of Rotor | 1 Min. | | 30 Min. | 60 Min. |

What is claimed is:

1. A method for spin-testing a turbocharger rotor, said rotor including a shaft portion which is fixed to an assembly of component parts which include a thrust bearing, a spacer, at least one of a sleeve portion and compressor rotor portion, and a lock nut, wherein the improvement comprises the steps of:
   preparing an integral composite member consisting of at least two of said component parts;
   dynamically balancing said turbocharger rotor, without said shaft portion fixed to said assembly;
   placing said turbocharger rotor and said integral composite member in a testing device, such that said shaft portion and said assembly are fixed to each other by said lock nut, and are rotatable as a unit; and
   rotating said turbocharger rotor and said assembly in said testing device, to effect said spin-testing.

2. A method according to claim 1, wherein said turbocharger rotor comprises ceramics.

3. A device for spin-testing a turbocharger rotor having a blade portion and a shaft portion, the turbocharger rotor being used in connection with a compressor rotor, comprising:

a simulation attachment assembly including an integral composite member, and a lock nut, said integral composite member consisting of a thrust-bearing portion, a spacer portion, and at least one of a sleeve portion and a compressor-rotor portion corresponding to said compressor rotor;

a bearing housing for rotatably supporting said turbocharger rotor and said simulation attachment assembly such that said shaft portion extends through said integral composite member, with said lock nut being fixed to one end of said shaft portion remote from said blade portion, said thrust-bearing portion of said composite member supporting said shaft portion; and means for blowing a high-velocity stream of gases on said blade portion of the turbocharger rotor, to rotate said turbocharger rotor together with said simulation attachment assembly, for effecting said spin-testing.

4. A device according to claim 3, wherein said integral composite member consists of said spacer portion and said sleeve portion.

5. A device according to claim 3, wherein said integral composite member consists of said spacer portion and said compressor-rotor portion.

6. A device for spin-testing a turbocharger rotor having a blade portion and a shaft portion, the turbocharger rotor being used in connection with a compressor rotor, comprising:

a simulation attachment assembly including an integral composite member, a thrust bearing and a lock nut, said integral composite member consisting of a spacer portion and at least one of a sleeve portion and a compressor-rotor portion corresponding to said compressor rotor;

a bearing housing for rotatably supporting said turbocharger rotor and said simulation attachment assembly such that said shaft portion extends through said thrust bearing and said integral composite member, with said lock nut being fixed to one end of said shaft portion remote from said blade portion, said thrust bearing supporting said shaft portion adjacent to said integral composite member; and means for blowing a high-velocity stream of gases on said blade portion of the turbocharger rotor, to rotate said turbocharger rotor together with said simulation attachment assembly, for effecting said spin-testing.

7. A device according to claim 6, wherein said integral composite member consists of said spacer portion and said sleeve portion.

8. A device according to claim 6, wherein said integral composite member consists of said spacer portion and said compressor-rotor portion.

* * * * *